April 9, 1940.                F. SPAULDING                2,196,480
                      MOTION PICTURE PROJECTION MACHINE
                           Filed July 7, 1938        2 Sheets-Sheet 1
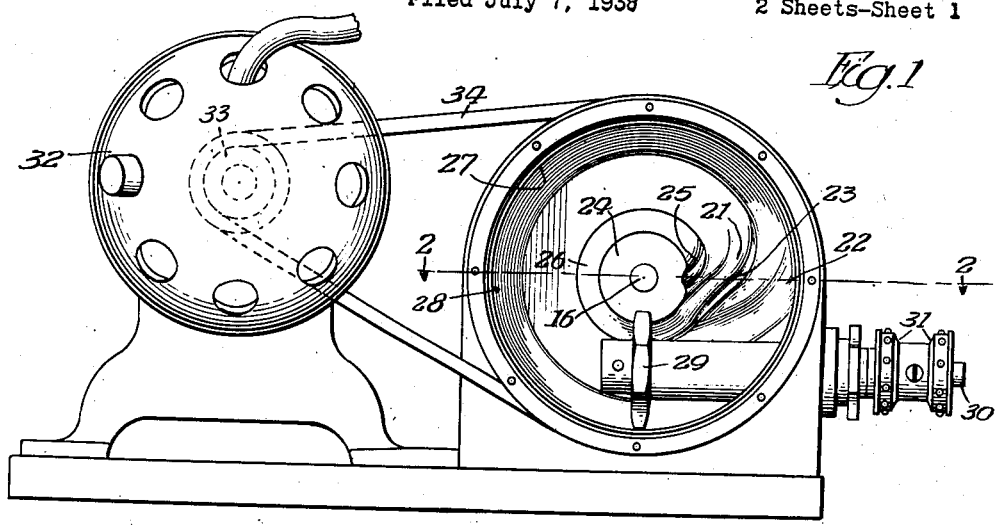
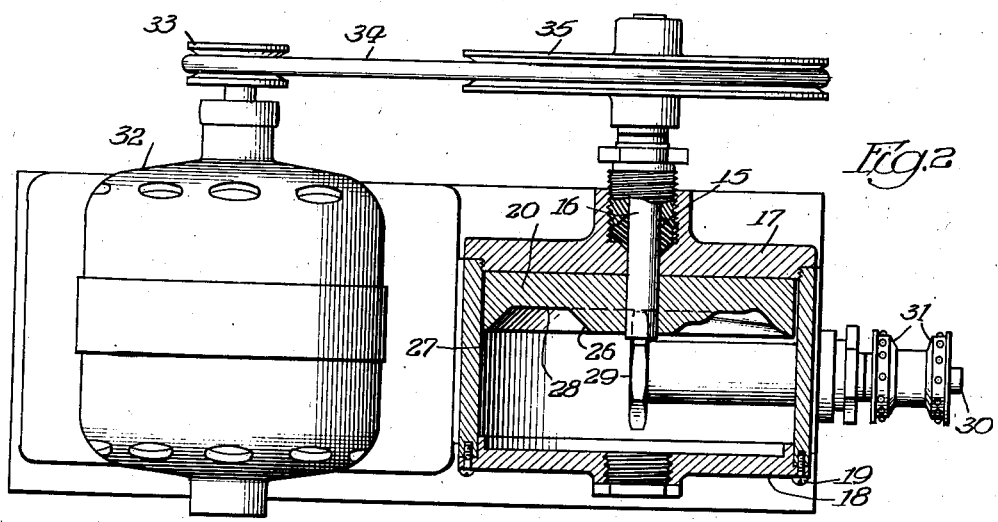
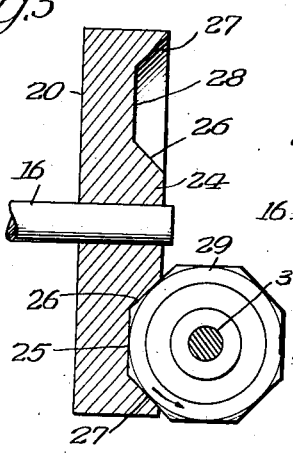
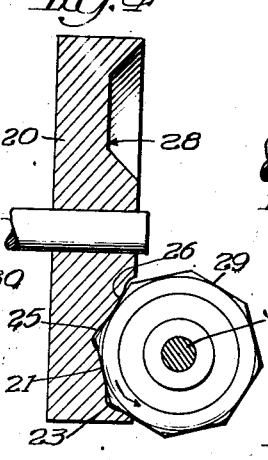
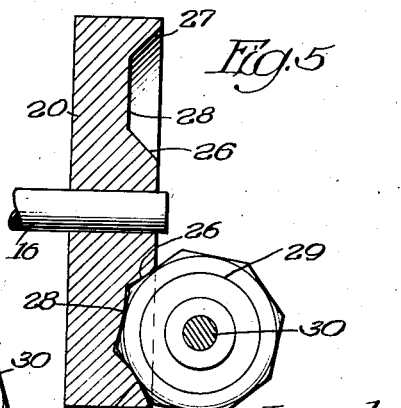
Inventor
Franklin Spaulding

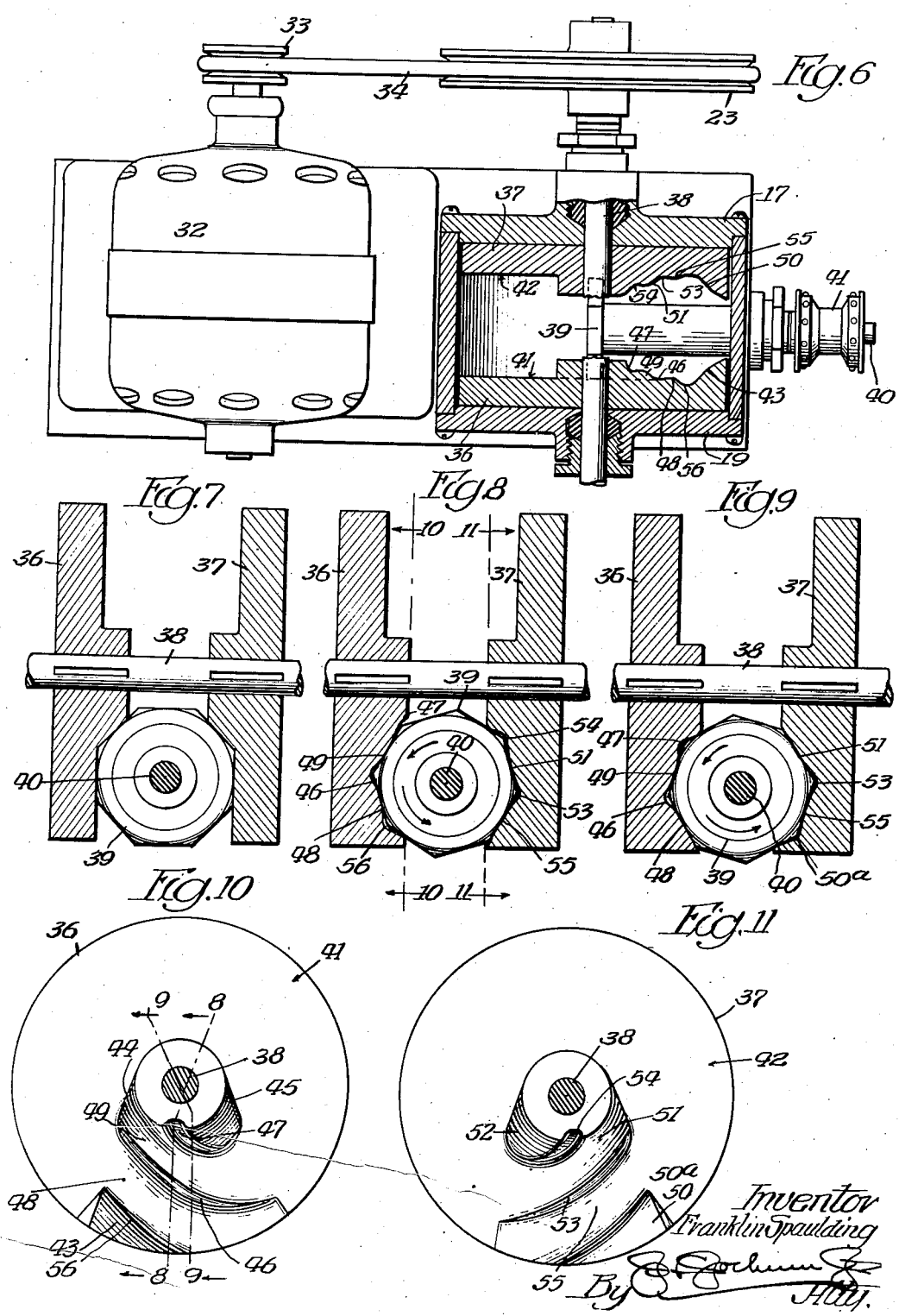

Patented Apr. 9, 1940

2,196,480

UNITED STATES PATENT OFFICE 2,196,480

MOTION PICTURE PROJECTION MACHINE

Franklin Spaulding, Chicago, Ill., assignor of one-half to Ernst Nell, Chicago, Ill.

Application July 7, 1938, Serial No. 217,945

10 Claims. (Cl. 74—436)

This invention relates in general to motion picture projection apparatus but more specifically to mechanism for advancing the film across the light aperture by an intermittent or step by step movement, and one of the objects of the invention is to provide an improved cam device and co-operating mechanism whereby the desired movement of the film will be produced.

A further object is to provide improved cam mechanism of this character particularly adapted, though not necessarily limited in use, to cause the film to be advanced at a more rapid speed during a portion of the operation of the mechanism than during another portion of such operation, and to lock the advancing mechanism against advancing the film while light rays are passing through the film.

A further object is to provide improved mechanism of this character which operates to permit relative long intervals of rest and also to provide for a quick movement between consecutive intervals of rest, and which movements will start gradually, with the result that all danger or tendency of tearing the film by a quick or sudden jerk will be obviated.

To the attainment of these ends and other new and useful objects as will appear, the invention consists in the features of novelty in substantially the construction, combination and arrangement of the several parts hereinafter more fully described and claimed and shown in the accompanying drawings illustrating this invention, and in which Figure 1 is a view in side elevation and with parts removed of a device of this character, constructed in accordance with the principles of this invention.

Figure 2 is a view partly in plan and and partly in section taken on line 2—2, Figure 1.

Figures 3, 4 and 5 are sectional views of a cam device taken through different portions of the cam with a gear co-operating therewith.

Figure 6 is a view similar to Figure 2 of a modified form of the invention in which two cam devices are employed.

Figure 7 is a vertical sectional view of the cam devices with a gear co-operating therewith.

Figures 8 and 9 are views similar to Figure 7 showing different types of cam devices.

Figure 10 is a sectional view taken on line 10—10, Figure 8.

Figure 11 is a sectional view taken on line 11—11, Figure 8.

Referring more particularly to the drawings, the numeral 15 designates a shaft mounted in a suitable bearing 16 and passing through a wall 17 of a housing, the opposite wall 18 of the housing being preferably removably secured in position by means of suitable fastening devices 19. Within the housing thus formed and secured to the shaft 15 for rotation therewith is a cam 20 provided with cam surfaces 21—22 with a groove 23 therebetween. The cam surface 21 preferably terminates at one end in a conical hub shaped portion 24 and a groove 25 is provided between the hub and the cam surface 21.

The periphery of the hub 24 forms an inclined surface 26 and encompassing the cam member is another surface 27 which is also inclined, while the intermediate surface 28 of the cam is a plane surface or flat.

The cam surfaces may be of any desired length and configuration but are preferably arranged so that they extend substantially generally in a spiral direction about the axis of the cam.

A gear 29 co-operates with the cam device and this gear is angular in cross-section preferably of a hexagonal configuration and is secured to a shaft 30, the axis of which is arranged at right angles to the axis of the shaft 15. The shaft 30 is mounted in a suitable bearing and to the end of the shaft which is disposed outside of the housing in which the cam is located, is a film sprocket wheel 31.

The gear 29 is so arranged that the peripheral edge thereof will be disposed in close proximity to or contact the face of the cam so that when the cam is rotated the respective cam faces will engage successive edges of the gear to cause partial rotation thereof.

The major portion of the cam disc is provided with a plane surface 28 and in the form of the invention shown in Figures 1 to 5 the plane surface is of a width that one of the faces of the gear 29 will contact the same. This surface 28 co-operating with the surfaces 26—27 which engage other faces of the gear 29 will lock the latter against rotation until the cams 21 and 22 together with the grooves 23 and 25 assume, in the rotation of the cam disc, positions that the cams will successively engage successive edges of the gear to turn the latter one step of rotation. The grooves 23 and 25 will permit such step of turning movement by reason of the edges or corners provided between adjacent faces of the gear entering such grooves.

The cams are so constructed that they will provide a slow starting turning movement which movement will increase as the gear is turned.

Any suitable means may be provided for rotating the cam disc 20 such as a motor 32 having a pulley 33 on its axle over which pulley an endless driving belt 34 passes and which belt in turn passes over a pulley 35 on the shaft 15 of the cam disc 20.

In this form of the invention a single cam disc is employed.

In the form of the invention shown in Figures 6 to 11 double cam discs 36—37 are employed which are mounted upon a shaft 38 for rotation therewith. The cam discs are spaced from each other a sufficient distance that the gear 39 may assume a position therebetween to contact the faces of the cam discs. This gear 39 is angular in cross-section, preferably hexagonal, and is secured to a shaft 40 for rotation therewith. The axis of the shaft 40 and the gear 39 is disposed at a right angle to the axis of the shaft 38.

In this form of the invention the peripheral flange embodying the inclined surface 27 (in the form of the invention shown in Figures 1 to 5) is omitted and a large or major portion of the cams 36—37 constitutes a plane surface respectively designated by the references 41 and 42.

The cam disc 36 is provided with cams 43, 44 and 45 projecting laterally therefrom with a groove 46 between cams 43 and 44, and a groove 47 between the cams 44 and 45, and with plane surfaces 48 and 49.

The cam disc 37 is provided with cams 50, 51 and 52 with a groove 53 between the cams 50 and 51, and a groove 54 between the cams 51 and 52 with a plane surface 55.

When the discs 36—37 are assembled on the shaft 38 the cam surfaces will be disposed towards each other and in the idle position the surfaces or edges of the gear 39 will engages or contact the plane surfaces 41 and 42 respectively of the discs 36—37 and also the surfaces 44 and 52, as shown more clearly in Figure 7.

When the discs are rotated in unison the gear 39 will start to turn with a slow movement and during the rotation of the discs 36 and 37 the gear 39 will first assume the position as shown in Figure 8. Starting from the lower edge of the cam, the cams act upon the successive faces of the gear to rotate it causing one of the edges of the gear to enter the groove 56 while the plane surface 48 contacts one of the faces of the gear. At the same time another edge of the gear will enter the groove 46 while the surface 49 contacts another edge or face of the gear, and the adjacent or corner of the gear will enter the groove 47.

At the same time the plane surface 55 of the opposite cam disc will contact one of the edges or faces of the gear, a corner or edge of the gear entering the groove 53, the face 51 contacting another face or edge of the gear, while the adjacent edge of the gear will enter the groove 54. Thus it will be seen that in this form of the invention there will be a plurality of cams successively engaging a plurality of successive edges of the gear to partially rotate the same and that a plurality of faces will simultaneously engage and lock the gear against rotation.

The cam discs 36—37 may be driven in a manner similar to that shown in Figure 1 by means of the pulley 23 connected to the shaft 40 for rotation therewith and the endless pulley 34 which passes over the pulley and over the pulley 33 which is secured to the shaft of the motor 32 for rotation therewith.

While in the present exemplifications of this invention the mechanism is shown in connection with a motion picture projection apparatus, it is manifest that this mechanical movement is well adapted for many other uses in which it is desired to rotate a shaft or member intermittently and to start the rotation at a slow rate of speed and is subsequently given a rapid step of rotation, the shaft being locked against rotation during the successive steps of rotation therewith.

While the preferred forms of the invention have been herein shown and described, it is to be understood that various changes may be made in the details of construction and arrangement and combination of the several parts, within the scope of the claims, without departing from the spirit of this invention.

What is claimed as new is:

1. In a motion picture apparatus, a driving and a driven shaft arranged with their axes at an angle to each other, a cam disc on the driving shaft, and a gear angular in cross-section on the driven shaft, said disc having two cams projecting beyond the plane of its surface and separated by a groove, a portion of which latter is spiral, said cams successively engaging successive edges of the gear to cause partial rotation thereof, the major portion of the said disc having a plurality of plane surfaces to be simultaneously engaged by different faces of said gear to lock the latter against rotation.

2. In a motion picture apparatus, a driving and a driven shaft arranged with their axes at an angle to each other, a cam disc on the driving shaft, and a gear angular in cross-section on the driven shaft, said disc having two cams projecting beyond the plane of its surface and separated by a groove, a portion of which latter is spiral, said cams successively engaging successive edges of the gear to cause partial rotation thereof, the major portion of the said disc having a plurality of plane surfaces to be simultaneously engaged by different faces of said gear to lock the latter against rotation, the said disc being provided with a plurality of cam engaging surfaces occupying planes disposed at an angle to each other.

3. In a motion picture apparatus, a driving and a diven shaft arranged with their axes at an angle to each other, a cam disc on the driving shaft, and a gear angular in cross-section on the driven shaft, said disc having two cams projecting beyond the plane of its surface and separated by a groove, a portion of which latter is spiral, said cams successively engaging successive edges of the gear to cause partial rotation thereof, the major portion of the said disc having a plurality of plane surfaces to be simultaneously engaged by different faces of said gear to lock the latter against rotation, one of said surfaces of said disc being flat radially and another of said surfaces being flat and inclined to and encompassing the last recited surface.

4. In a motion picture apparatus, a driving and a driven shaft arranged with their axes at an angle to each other, a cam disc on the driving shaft, and a gear angular in cross-section on the driven shaft and provided with a plurality of cam engaging surfaces, said disc having two cams projecting beyond the plane of its surface and separated by a groove, a portion of which latter is spiral, said cams successively engaging successive edges of the gear to cause partial rotation thereof, the major portion of the said disc having a plurality of plane surfaces to be simultaneously engaged by different faces of said gear to lock the latter against rotation, one of said surfaces of said disc being flat radially, and other of said surfaces being flat and inclined to and encompassing the last recited surface, said inclined surfaces being concentrically arranged and spaced from each other, whereby a plurality of faces of said gear will simultaneously engage or stand in close proximity to said flat surfaces.

5. In combination a driving and a driven shaft arranged with their axes at an angle to each other, cam discs on the driving shaft spaced from each other in directions lengthwise of the axis of the shaft, each of said discs having on their proximate faces two cams projecting from its surface and separated by a groove, a portion of which latter is spiral, and a gear, angular in cross-section on the driven shaft disposed between said cam discs, the cams on each of said discs successively engaging successive edges of the gear to cause partial rotation thereof, the major portion of each of said discs having a plane surface to be simultaneously engaged by different faces of said gear to lock the latter against rotation.

6. In combination a driving and a driven shaft arranged with their axes at an angle to each other, cam discs on the driving shaft spaced from each other in directions lengthwise of the axis of the shaft, each of said discs having on their proximate faces two cams projecting beyond the plane of its surface and separated by a groove, a portion of which latter is spiral, and a gear angular in cross-section on the driven shaft disposed between said cam discs, the cams on each of said discs successively engaging successive edges of the gear to cause partial rotation thereof, the major portion of each of said discs having a plurality of plane surfaces to be simultaneously engaged by different faces of said gear to lock the latter against rotation.

7. In combination a driving and a driven shaft arranged with their axes at an angle to each other, cam discs on the driving shaft spaced from each other in directions lengthwise of the axis of the shaft, each of said discs having on their proximate faces two cams projecting from its surface and separated by a groove, a portion of which latter is spiral, and a gear angular in cross-section on the driven shaft disposed between said cam discs, the cams on each of said discs successively engaging successive edges of the gear to cause partial rotation thereof, the major portion of each of said discs having a plurality of plane surfaces to be simultaneously engaged by different faces of said gear to lock the latter against rotation, the said surfaces of each of the discs occupying planes disposed at angles to each other.

8. In a motion picture apparatus, a driving and a driven shaft arranged with their axes at an angle to each other, a cam disc on the driving shaft, and an octagonal gear on the driven shaft, said disc having two cams projecting beyond the plane of its surface and separated by a groove, a portion of which latter is spiral, said cams successively engaging successive edges of the gear to cause partial rotation thereof, the major portion of the said disc having a plurality of plane surfaces to be simultaneously engaged by different faces of said gear to lock the latter against rotation.

9. A mechanical movement comprising a rotary driving shaft having a driving member fixed thereon so as to be immovable axially of said driving shaft during rotation of the latter, and a polygonal-shaped rotary driven member adapted to be driven by the said driving member, the said rotary driving member including a side wall having a cam surface thereon and the said polygonal-shaped rotary driven member including a plurality of peripheral edge surfaces successively engaged by said cam surface during rotation of the said driving member and moved thereby to convert continuous rotary motion of the said driving member into intermittent rotary motion of the said driven member.

10. A film-advancing device comprising a rotary driving shaft having a driving member fixed thereon so as to be immovable axially thereof during rotation of the said driving shaft, and a polygonal-shaped rotary driven member adapted to be driven by the said driving means, and film-engaging means operatively associated with and operable by the said driven member, the said rotary driving member including a side wall having a cam surface thereon and the said polygonal-shaped rotary driven member including a plurality of peripheral edge surfaces successively engaged by the said cam surface during rotation of the said driving member and moved thereby to convert continuous rotary motion of the said driving member into motion of the said driven member and the said film-engaging means during part of each revolution of the said driving member, the said side wall of the said driving member frictionally engaging one of the said peripheral edge surfaces on the said driven member to hold the said driven member and the said film-engaging means against movement during the remainder of each revolution of the said driving member, the said cam surface cooperating with the said polygonal-shaped driven member to impart to the latter and to the said film-engaging means a relatively slow movement during the beginning and end phases of each rotative cycle of the said driving member and relatively rapid movement during the intermediate or middle phase of each rotative cycle of the said driving member.

FRANKLIN SPAULDING.